Jan. 27, 1970  H. DINGER ET AL  3,491,731
LIQUID-COOLED CYLINDER HEAD OF AN INTERNAL COMBUSTION ENGINE
Filed Dec. 27, 1967  3 Sheets-Sheet 1

INVENTORS
HANS DINGER
HERBERT DEUTSCHMANN
ULRICH CONRAD
WILLI MULLER

BY Craig & Antonelli

ATTORNEYS

INVENTORS
HANS DINGER
HERBERT DEUTSCHMANN
ULRICH CONRAD
WILLI MULLER

BY Craig & Antonelli
ATTORNEYS

Jan. 27, 1970  H. DINGER ET AL  3,491,731
LIQUID-COOLED CYLINDER HEAD OF AN INTERNAL COMBUSTION ENGINE
Filed Dec. 27, 1967  3 Sheets-Sheet 3

INVENTORS
HANS DINGER
HERBERT DEUTSCHMANN
ULRICH CONRAD
WILLI MULLER

BY Craig & Antonelli

ATTORNEYS 3,491,731
LIQUID-COOLED CYLINDER HEAD OF AN
INTERNAL COMBUSTION ENGINE
Hans Dinger, Stuttgart, Herbert Deutschmann, Stuttgart-Bad Cannstatt, Ulrich Conrad, Ludwigsburg-Ossweil, and Willi Müller, Stuttgart, Germany, assignors to Daimler-Benz Aktiengesellschaft, Stuttgart-Unterturkheim, Germany
Filed Dec. 27, 1967, Ser. No. 693,850
Claims priority, application Germany, Dec. 29, 1966, D 51,902
Int. Cl. F02f 1/36; F01p 3/14, 1/06
U.S. Cl. 123—41.82                    11 Claims

ABSTRACT OF THE DISCLOSURE

A liquid-cooled cylinder head for an internal combustion engine, which is adapted to be secured at the cylinder housing by means of bolts provided within the circumferential area of the cylinder head and in which gas spaces such as valve channels and possibly a combustion chamber, pre-chamber or the like are so arranged that the outer walls of the gas spaces disposed about the cylinder axis form star-shaped cooling-liquid flow-channels pointing toward the center area of the cylinder head bottom; inlet bores disposed at the cylinder circumference and a discharge channel are associated with the star-shaped flow-channels while upwardly extending intermediate walls are arranged within the area of the narrowest places of at least some mutually symmetrically disposed star-shaped flow-channels whereby the walls are preferably disposed approximately parallel to the axis of the cylinder and in their upper parts are extended upwardly at an inclination toward the outside while approximately radial bores extend through the lower parts of the intermediate walls for the cooling liquid passage.

BACKGROUND OF THE INVENTION

The present invention relates to a liquid-cooled cylinder head of an internal combustion engine which is adapted to be secured at the cylinder housing by means of bolts provided in its circumferential area, and in which the gas spaces, i.e., the valve channels and possibly a combustion chamber, a pre-chamber or the like are so arranged that the external walls of the gas spaces arranged about the cylinder axis form cooling-liquid flow-channels arranged in a star-shaped manner and pointing toward the center area of the cylinder head bottom, whereby inlet bores are coordinated to the cooling-liquid flow-channels at the cylinder circumference and an outlet channel for the cooling-liquid is coordinated thereto over the center area.

With such a known cylinder head, described, for example, in the German Patent 938,159, the star-shaped cooling-liquid flow-channels are formed between three gas spaces; namely, between one inlet and one exhaust valve each and a combustion chamber. Even if deflection surfaces are provided outside of the star-shaped channels which are intended to deflect the cooling-liquid flow, coming from the cylinder housing approximately parallel to the cylinder axis, toward the bottom of the cylinder head, it remains still unsatisfactory with such prior art construction that the cooling liquid in the star-shaped flow-channels which are relatively long and relatively high in the axial direction, circumcirculate only partly about the center area of the cylinder head bottom which becomes hottest as a result of the combustion in the cylinder. Furthermore, even though a connection, which in many cases is still sufficiently strong, is achieved between the cylinder head bottom and the support places of the cylinder head at the bolts fastening the same at the cylinder housing by the walls of the aforementioned gas spaces, it still remains unfavorable that with larger loads and stresses, still undesirable elastic deformations of the cylinder bottom and of the suction and exhaust channels occur which entail the danger of cracks in the endangered cross sections.

Summary of the invention

The present invention aims at avoiding the aforementioned drawbacks and to create therewith a cylinder head of the aforementioned type which is able to withstand higher demands both as regards the thermal loads as also as regards the pressure loads.

The underlying problems are solved in accordance with the present invention essentially in that within the area of the narrowest places of at least some mutually symmetrically disposed star-shaped cooling-liquid flow-channels, upwardly extending intermediate walls are arranged which are disposed approximately parallel to the axis and are extended at the top obliquely outwardly toward the circumferential area of the cylinder head whereas approximately radial bores for the cooling liquid passage extend through the lower portions of the intermediate walls.

With such a construction of the cylinder head, the cooling liquid flowing into the star-shaped flow-channels radially from the outside toward the inside is directed through the radial bores of the intermediate walls with high velocity directly toward the thermally maximum loaded central bottom zone of the cylinder head whereas the intermediate walls simultaneously assure an additional rigid support of the cylinder head bottom toward the support places of the cylinder head at the bolts.

According to a preferred construction of the present invention, the intermediate walls which are traversed by the radial bores, are arranged each between the walls of adjacent inlet and exhaust valve channels of the cylinder head, which is provided with two inlet and two exhaust valve channels about an axial combustion chamber. The measures according to the present invention become particularly advantageous with such an arrangement because the thermal loading, which is inherently already high in the center area of the cylinder head bottom, is additionally increased by an arrangement thereat of the combustion chamber and can be cooled particularly advantageously by the cooling-liquid flow in accordance with the present invention.

According to a further feature of the present invention, the radial bores are inclined slightly toward the center of the cylinder head bottom.

In order to avoid that air cavities or bubbles of the cooling liquid which have possibly remained behind in the cooling liquid spaces disposed radially outwardly of the intermediate walls by reason of the relatively small flow cross section of the radial bores, lead to air pockets in these spaces which are thereby lost for the liquid cooling, according to a further feature and construction of the present invention one small venting bore each leading directly into the discharge channel of the cooling liquid is provided at the highest places of the cooling-liquid spaces disposed radially outwardly of the intermediate walls.

Accordingly, it is an object of the present invention to provide a cylinder head for a liquid-cooled internal combustion engine which avoids by simple means the aforementioned shortcomings and drawbacks encountered with the prior art.

Another object of the present invention resides in a cylinder head for a liquid-cooled internal combustion engine which is simple in construction, assures adequate cooling, in particular of those parts subjected to high thermal loads, and additionally offers improved strength.

A further object of the present invention resides in a cylinder head of the type described above which is provided with cooling-liquid passages arranged in such a manner as to cool completely satisfactorily the particularly hot center area of the cylinder head bottom.

A still further object of the present invention resides in a cylinder head for a liquid-cooled internal combustion engine in which undesirable elastic deformations of the cylinder head bottom and of the suction and exhaust channels are avoided in case of relatively larger loads.

Still another object of the present invention resides in a cylinder head construction for liquid-cooled internal combustion engines which effectively minimizes the danger of crack formation while assuring sufficient strength to withstand all expected temperature loads as well as pressure stresses.

Another object of the present invention resides in a cylinder head for liquid-cooled internal combustion engines of the type described above which not only achieves all of the aforementioned aims and objects in a completely satisfactory manner but additionally provides reinforcements in those places in which the cylinder head is secured at the cylinder housing by means of the cylinder head bolts.

Still another object of the present invention resides in a cylinder head for liquid-cooled internal combustion engines in which the formation of air pockets in the cooling liquid passages and spaces of the cylinder head is effectively avoided.

These and further objects, features, and advantages of the present invention will become more obvious from the following description when taken in connection with the accompanying drawing which shows, for purposes of illustration only, one embodiment in accordance with the present invention, and wherein.

Figure 1:
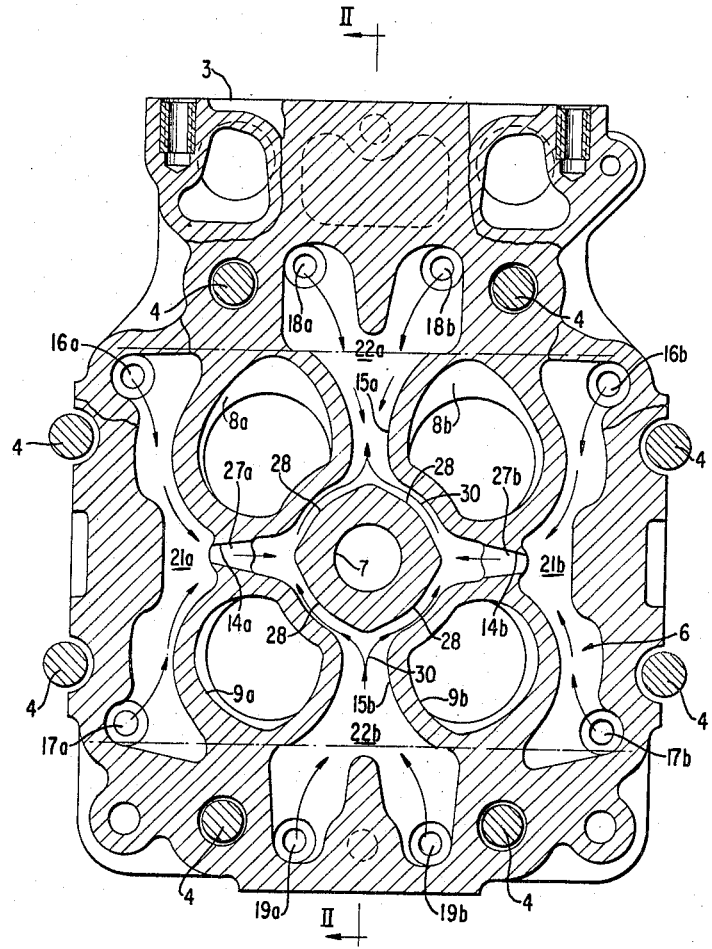
FIGURE 1 is a cross-sectional view, at right angle to the cylinder axis through a cylinder head in accordance with the present invention and taken close above its cylinder head bottom.
Figure 2:
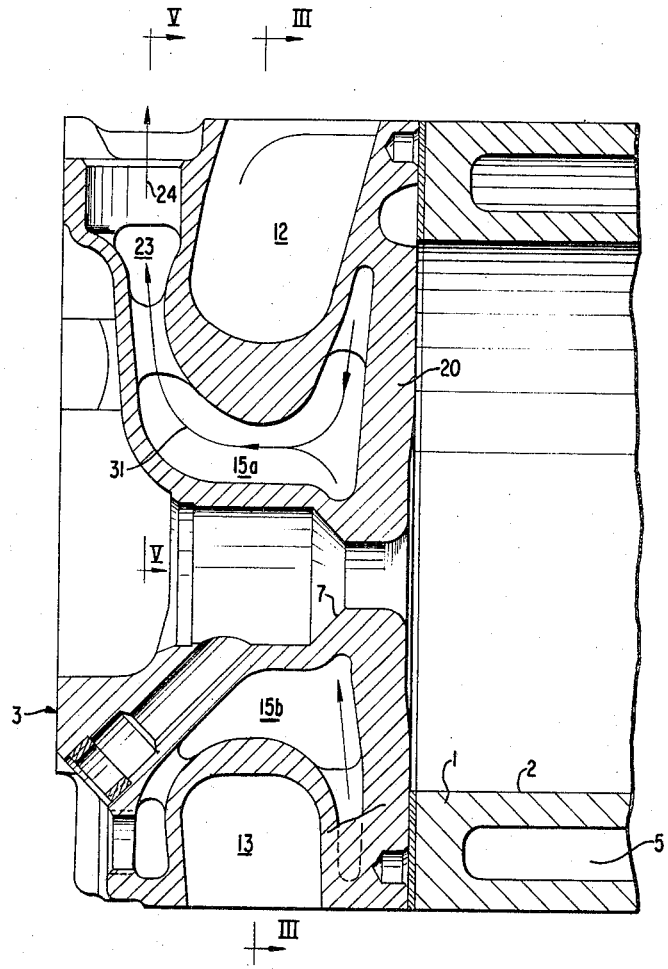
FIGURE 2 is an axial cross-sectional view of the cylinder head of FIGURE 1, taken along line II—II of FIGURE 1.

Referring now to the drawing wherein like reference numerals are used throughout the various views to designate like parts throughout the various views, and more particularly to FIGURES 1 and 2, a cylinder head generally designated by reference numeral 3 is secured by means of bolts 4 on the cylinder housing 1 of an internal combustion engine above a cylinder space 2. The cylinder housing 1 and cylinder head 3 are liquid-cooled; namely, the cylinder housing 1 by means of a cooling jacket 5 (FIG. 2) and the cylinder head 3 by means of a cooling jacket generally designated by reference numeral 6 (FIG. 1) which consists in a manner to be described more fully hereinafter of different partial spaces in communication with each other.

The cylinder head 3 is provided about an axial combustion chamber 7 with two inlet valve channels 8a and 8b and with two exhaust valve channels 9a and 9b to which one valve each (not shown) is coordinated in a conventional manner. The two inlet valves are guided in guidances 10a and 10b (FIG. 3) and the two exhaust valves in guidance 11a and 11b of the cylinder head 3. According to FIG. 3, the sucked-in combustion air reaches the inlet valve channels 8a and 8b by way of a suction channel 12 whereas the combustion gases flow off out of the exhaust valve channels 9a and 9b into an exhaust channel 13.

Between the walls of the valve channels 8a, 8b and 9a, 9b arranged about the combustion chamber 7 are formed four star-shaped and simultaneously radially outwardly extending cooling water flow channels 14a and 14b as well as 15a and 15b to which the cooling water is supplied radially from the outside toward the inside from eight inlet bores 16a, 16b, 17a, 17b, 18a, 18b, and 19a, 19b, disposed in the outer circumferential area of the cylinder head and in communication in a conventional manner (not illustrated) with the cooling jacket 5 of the cylinder housing 1. One obtains from this arrangement within the area of the cylinder head 3 directly above the bottom 20 and outside of the flow channels 14a, 14b and 15a, 15b, one cooling outer space each; namely, 21a, 21b, 22a and 22b, which, in turn, is in communication with two inlet bores each; namely, with inlet bores 16a, 17a, and 16b, 17b and 18a, 18b, and 19a, 19b, respectively. Of the cooling water flow channels, the flow channel 15a is according to FIGURE 2 in communication in the upper part with a discharge channel 23 for the cooling water extending over the suction channel 12 (see also FIGURE 5) through which the cooling-water is able to flow off out of the cylinder head 3 in the usual manner in the direction of the arrow 24.

Figure 3:
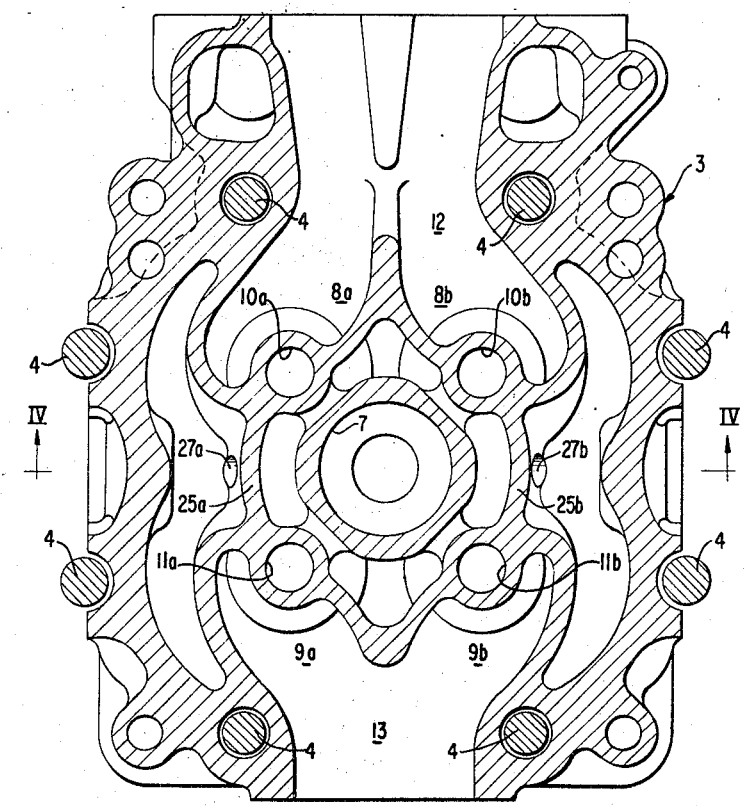
FIGURE 3 is a cross-sectional view through the cylinder head, at right angle to the cylinder axis and taken along line III—III of FIGURE 2.
Figure 4:
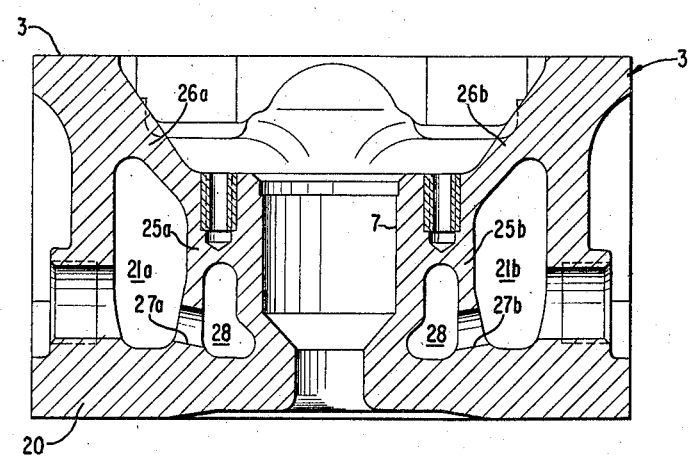
FIGURE 4 is an axial cross-sectional view taken along line IV—IV of FIGURE 3.

As can be seen from FIGURES 1, 3, and 4, intermediate walls 25a and 25b which extend upwardly approximately parallelly to the axis, are arranged within the area of the narrowest places of the two symmetrical opposite cooling water flow channels 14a and 14b; these intermediate walls 25a and 25b pass over at the top into inclined wall portions 26a and 26b extending outwardly at an inclination toward the circumferential area of the cylinder head 3, while the wall portions 26a and 26b also support upwardly and outwardly the combustion chamber 7 constructed, for example, as pre-chamber. The intermediate walls 25a and 25b are traversed in their lower area by one bore 27a and 27b, respectively, inclined approximately radially to the cylinder head and at the same time slightly inclined toward the center of the bottom 20 which establish the communication from the outer cooling water spaces 21a and 21b with the annular space 28 surrounding the combustion chamber 7.

Figure 5:
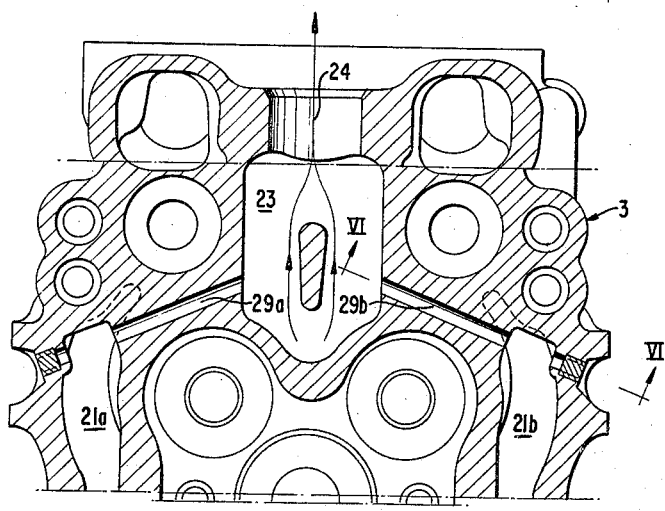
FIGURE 5 is a partial cross-sectional view at right angle to the cylinder axis and taken along line V—V of FIGURE 2.
Figure 6:
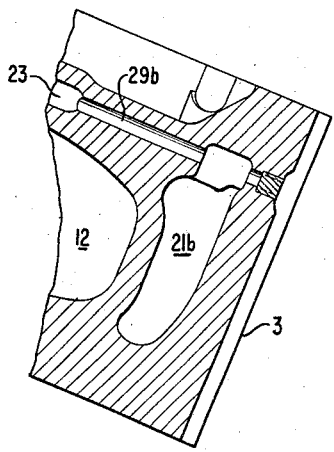
FIGURE 6 is a partial cross-sectional view, taken along line VI—VI of FIGURE 5.

Finally, the cooling water spaces 21a and 21b disposed outside of the intermediate walls 25a and 25b are in communication at their highest places according to FIGURES 5 and 6 with the discharge channel 23 for the cooling water by way of a small venting bore 29a and 29b, respectively.

During the operation of the internal combustion engine provided with the described cylinder head, the cooling-water which reaches the outer cooling water spaces 21a, 21b as well as 22a and 22b by way of the inlet bores 16a, 16b, 17a, 17b, 18a, 18b and 19a, 19b flows through the radial flow channels 14a, 14b, 15a and 15b, distributed star-shaped about the combustion chamber 7, centrally toward the wall of the combustion chamber 7 whence a very effective cooling of the hottest center part of the cylinder head 3 and in particular of the bottom 20 of the cylinder head results. A particularly effective construction and simultaneous acceleration of the cooling water flow, however, results from the bores 27a and 27b in the intermediate walls 25a and 25b, directed at an inclination toward the bottom 20, which produce by their connection with the upper inclined wall parts 26a and 26b at the same time an advantageous reinforcement and support of the center area of the bottom 20 in the direction toward the support places of the cylinder head 3 at the bolts 4. The cooling water flowing through the flow channels 14a, 14b and 15b toward the walls of the combustion chamber 7 flows about the combustion chamber 7 in the direction of the arrows 30 of FIGURE 1 toward the flow channel 15a, within which the cooling water which also flows into the same, flows upwardly in the direction of arrow 31 (FIG. 2) and thus reaches the discharge or outlet channel 23.

In the event that air bubbles or cavities should collect in the outer cooling water spaces 21a and 21b, they are conducted away directly into the outlet channel 23 by way of the small bores 29a and 29b (FIGS. 5 and 6) whence notwithstanding the throttling of the cooling water flow at the bores 27a and 27b, no air pockets can form in the outer cooling water spaces 21a and 21b.

It is possible by the construction described above of the cylinder head to conduct the entire cooling water quantity with high velocity near the bottom 20 of the cylinder head 3 toward the thermally maximum loaded cylinder head center whereas the intermediate walls 25a and 25b provided for this purpose simultaneously effect an advantageous, additional support of the bottom 20 in the upward direction and in the direction toward the support places of the cylinder head 3 at the bolts 4. The elastic deformation of the bottom 20 and of the suction and exhaust channels is reduced by this support and therewith simultaneously the danger of cracking of the cylinder head in its endangered cross sections is lessened.

While we have shown and described only one embodiment in accordance with the present invention, it is understood that the same is not limited thereto but is susceptible of numerous changes and modifications as known to a person skilled in the art. For example, it is not necessary that the gas spaces formed by the combustion chamber and the valve channels are provided exactly in the number described herein even though the application of the invention to a cylinder head corresponding to the illustrated embodiment with central pre-chamber entails particular advantages as regards thermal and mechanical loadability of the cylinder head. Furthermore, the present invention is also not limited to a cooling by means of cooling water as naturally any other suitable cooling liquid is applicable with equal advantage. Consequently, we do not wish to be limited to the details shown and described herein but intend to cover all such changes and modifications as are encompassed by the scope of the invention.

We claim:

1. A liquid-cooled cylinder head of an internal combustion engine which is adapted to be secured at the cylinder housing by means of bolts provided over its circumferential area, and in which the gas spaces are so arranged that the outer walls of the gas spaces arranged about the cylinder axis form cooling liquid flow-channels arranged approximately star-shaped in the direction toward the center area of the cylinder head bottom, one of said gas spaces forming a pre-chamber, and in which inlet bores located along the cylinder circumference and an outlet channel for the cooling liquid are cordinated to the cooling-liquid flow-channels with the outlet channel being arranged over the center of the cylinder head, wherein the improvement comprises upwardly extending intermediate wall means arranged within the area of at least some of said cooling-liquid flow-channels which are extended at the top outwardly toward the circumferential area of the cylinder head and are provided with bore means for the passage of the cooling fluid, said intermediate wall means being arranged within the area of the narrowest places of the respective flow-channels and extending approximately parallel to the axis in the upward direction, said bore means extending approximately radially in the lower portions of the intermediate wall means and being slightly inclined toward the center of the cylinder head bottom, said intermediate wall means being further provided within the area of at least some mutually symmetrically arranged star-shaped cooling-liquid flow-channels, and said intermediate wall means are each arranged between the walls of adjacent inlet and exhaust valve channels of a cylinder head which is provided with two inlet and two exhaust valve channels about an axial combustion chamber.

2. A cylinder head according to claim 1, further comprising small venting bore means provided at the highest places of the cooling liquid spaces disposed radially outside of the intermediate wall means which are each in direct communication with the discharge channel of the cooling liquid.

3. A liquid-cooled cylinder head of an internal combustion engine which is adapted to be secured at the cylinder housing by means of bolts provided over its circumferential area, and in which the gas spaces are so arranged that the outer walls of the gas spaces arranged about the cylinder axis form cooling-liquid flow-channels arranged approximately star-shaped in the direction toward the center area of the cylinder head bottom, and in which inlet bores located along the cylinder circumference and an outlet channel for the cooling liquid are coordinated to the cooling-liquid flow-channels, wherein the improvement comprises upwardly extending intermediate wall means arranged within the area of at least some of said cooling-liquid flow-channels which are extended at the top outwardly toward the circumferential area of the cylinder head and are provided with bore means for the passage of the cooling liquid, and wherein said bore means are slightly inclined toward the center of the cylinder head bottom.

4. A cylinder head according to claim 3, wherein said intermediate wall means are each arranged between the walls of adjacent inlet and exhaust valve channels of a cylinder head which is provided with two inlet and two exhaust valve channels about an axial combustion chamber.

5. A cylinder head according to claim 4, further comprising small venting bore means provided at the highest places of the cooling liquid spaces disposed radially outside of the intermediate wall means which are each in direct communication with the discharge channel of the cooling liquid.

6. A cylinder head according to claim 5, wherein said intermediate wall means are arranged within the area of the narrowest places of the respective flow-channels.

7. A cylinder head according to claim 6, wherein said intermedate wall means are provided within the area of at least some mutually symmetrically arranged star-shaped cooling-liquid flow-channels.

8. A cylinder head according to claim 3, wherein said bore means extend approximately radially in the lower portions of the intermediate wall means.

9. A cylinder head according to claim 8, wherein said intermediate wall means are arranged within the area of the narrowest places of the respective flow-channels.

10. A liquid-cooled cylinder head of an internal combustion engine which is adapted to be secured at the cylinder housing by means of bolts provided over its circumferential area, and in which the gas spaces are so arranged that the outer walls of the gas spaces arranged about the cylinder axis form cooling-liquid flow-channels arranged approximately star-shaped in a direction toward the center area of the cylinder head bottom, and in which inlet bores located along the cylinder circumference and an outlet channel for the cooling liquid are coordinated to the cooling-liquid flow-channels, wherein the improvement comprises upwardly extending intermediate wall means arranged within the area of at least some of said cooling-liquid flow-channels which are extended at the top outwardly toward the circumferential area of the cylinder head and are provided with bore means for the passage of the cooling liquid, and further comprising small venting bore means provided at the highest places of the cooling liquid spaces disposed radially outside of the intermediate wall means which are each in direct communication with the discharge channel of the cooling liquid.

11. A cylinder head according to claim 10, wherein the intermediate wall means extend approximately parallel to the axis in the upward direction.

References Cited

UNITED STATES PATENTS

| | | | |
|---|---|---|---|
| 1,845,521 | 2/1932 | Ross | 123—41.77 |
| 2,234,780 | 3/1941 | Rippingille | 123—41.76 |
| 2,619,078 | 11/1952 | Witzky et al. | 123—32 |
| 2,736,300 | 2/1956 | Flynn | 123—41.31 |
| 2,739,579 | 3/1956 | Ware et al. | 123—41.31 |
| 3,081,755 | 3/1963 | Kotlin et al. | 123—41.77 |
| 3,353,522 | 11/1967 | Ley | 123—41.82 X |
| 3,377,996 | 4/1968 | Kotlin et al. | 123—41.82 X |

FOREIGN PATENTS

| | | |
|---|---|---|
| 724,461 | 2/1955 | Great Britain. |

AL LAWRENCE SMITH, Primary Examiner

U.S. Cl. X.R.

123—32, 41.31, 41.77, 191